United States Patent
Wei et al.

(10) Patent No.: US 7,508,174 B2
(45) Date of Patent: Mar. 24, 2009

(54) ANTI-RINGING SWITCHING REGULATOR AND CONTROL METHOD THEREFOR

(75) Inventors: Wei-Hsin Wei, Jhubei (TW); An-Tung Chen, Pingihen (TW); Nien-Hui Kung, Hsin-Chu (TW)

(73) Assignee: Richtek Technology Corporation, Hsin-Chu (TW)

( * ) Notice: Subject to any disclaimer, the term of this patent is extended or adjusted under 35 U.S.C. 154(b) by 21 days.

(21) Appl. No.: 11/900,678

(22) Filed: Sep. 13, 2007

(65) Prior Publication Data
US 2008/0238382 A1    Oct. 2, 2008

Related U.S. Application Data

(63) Continuation of application No. 11/893,956, filed on Aug. 17, 2007.

(30) Foreign Application Priority Data

Mar. 26, 2007   (TW) .............................. 96110405 A

(51) Int. Cl.
G05F 1/618    (2006.01)
(52) U.S. Cl. .................... 323/223; 323/282; 363/39
(58) Field of Classification Search ................ 323/223, 323/282, 222; 363/39, 41, 127, 56.04; 327/110
See application file for complete search history.

(56) References Cited

U.S. PATENT DOCUMENTS

| | | | | |
|---|---|---|---|---|
| 5,672,993 | A * | 9/1997 | Runaldue | 327/404 |
| 6,107,844 | A * | 8/2000 | Berg et al. | 327/110 |
| 6,275,399 | B1 * | 8/2001 | Miyazaki et al. | 363/98 |
| 6,333,623 | B1 * | 12/2001 | Heisley et al. | 323/280 |
| 6,747,441 | B2 * | 6/2004 | Johnson et al. | 323/282 |
| 6,798,178 | B1 * | 9/2004 | Bayadroun | 323/274 |
| 2006/0158127 | A1 * | 7/2006 | Xu | 315/128 |
| 2006/0192589 | A1 * | 8/2006 | Okazaki et al. | 326/112 |
| 2007/0040542 | A1 * | 2/2007 | Cortigiani et al. | 323/312 |
| 2008/0084197 | A1 * | 4/2008 | Williams et al. | 323/282 |

OTHER PUBLICATIONS

Adel Sedra and Kenneth Smith, Microelectronic Circuits, Dec. 1991, Third Edition, Saunders College Publishing, p. 428.*

* cited by examiner

*Primary Examiner*—Akm E Ullah
*Assistant Examiner*—Harry Behm
(74) *Attorney, Agent, or Firm*—Tung & Associates

(57) ABSTRACT

The present invention discloses an anti-ringing switching regulator, comprising a variable resistor, a transistor, and an inductor electrically connected to a common node, in which the variable resistor is electrically connected with an input voltage, the transistor is electrically connected to ground, and the inductor is electrically connected to an output terminal, whereby the input voltage is converted and transmitted to the output terminal according to the resistance variation of the variable resistor and the switching of the transistor.

9 Claims, 7 Drawing Sheets

US 7,508,174 B2

ANTI-RINGING SWITCHING REGULATOR AND CONTROL METHOD THEREFOR

CROSS-REFERENCE

The present invention is a continuation-in-part application of U.S. Ser. No. 11/893,956, filed on Aug. 17, 2007.

FIELD OF THE INVENTION

The present invention relates to a switching regulator and control circuit and method therefor. In particular, the present invention relates to a switching regulator with reduced switching ringing, and a control circuit and a control method for the switching regulator.

BACKGROUND OF THE INVENTION

Typical switching regulators include buck converter, boost converter, buck-boost converter and inverter converter FIG. 1 shows a conventional buck converter, which includes two transistor switches Q1 and Q2 respectively controlled by an up-gate control signal UG and a low-gate control signal LG. The switching of the transistors Q1 and Q2 controls the current amount and direction on the inductor L, so that power is transmitted to the output terminal OUT. The up-gate control signal UG and low-gate control signal LG for example can be PWM (pulse width modulated) or PFM (pulse frequency modulated) signals generated by methods well known to those skilled in this art, according to a feedback signal FB obtained from the output terminal OUT. FIGS. 2 and 3 respectively show a boost type switching regulator 2 and an inverter type switching regulator 3.

Referring to FIG. 1 in conjunction with FIG. 4, for better power conversion efficiency, U.S. Pat. No. 6,580,258 proposes a concept as shown in FIG. 4, in which the transistors Q1 and Q2 are properly controlled so that the Q2 is turned OFF when the direction of the inductor current is about to change from positive to negative. Thus, there is no power loss from the output terminal OUT. As shown in the figure, there is a time period T wherein the transistors Q1 and Q2 are both OFF, which is called the "sleep mode".

However, this prior art has its drawback. When the transistors Q1 and Q2 are both OFF, entering the sleep mode, the actual waveforms of the current $I_L$ flowing on the inductor L and the voltage at the node $V_{PH}$ are not ideal. As shown in FIG. 5, when the transistors Q1 and Q2 are both OFF, the current $I_L$ and the voltage $V_{PH}$ present ringing waveforms.

In view of the foregoing drawback, the present invention proposes a switching regulator with reduced switching ringing, and a method for controlling the switching regulator to reduce ringing.

SUMMARY OF THE INVENTION

A first objective of the present invention is to provide an anti-ringing switching regulator.

A second objective of the present invention is to provide a control method for controlling the switching regulator.

To achieve the foregoing objectives, according to an aspect of the present invention, an anti-ringing switching regulator comprises: a first transistor, a second transistor, and an inductor electrically connected to a common node, wherein the first transistor is electrically connected with an input terminal, the second transistor is electrically connected to ground, and the inductor is electrically connected with to an output terminal, and wherein power is transmitted from the input terminal to the output terminal by switching the states of the first and second transistors; characterized in that: the first transistor has at least two states: ON and low current state. In the low current state, the first transistor is controlled by a current control circuit.

According to another aspect of the present invention, an anti-ringing switching regulator comprises a variable resistor, a transistor, and an inductor electrically connected to a common node, in which the variable resistor is electrically connected with an input voltage, the transistor is electrically connected to ground, and the inductor is electrically connected to an output terminal, whereby the input voltage is converted and transmitted to the output terminal according to the resistance variation of the variable resistor and the switching of the transistor.

According to yet another aspect of the present invention, a method for controlling a switching regulator comprises the steps of: providing a switching regulator including a first transistor, a second transistor, and an inductor electrically connected to a common node, wherein the first transistor is electrically connected with an input terminal, the second transistor is electrically connected to ground, and the inductor is electrically connected with to an output terminal; switching the states of the first and second transistors; and in a time period after the second transistor switches OFF, setting the first transistor in a low current state.

According to the present invention, the first transistor has three states: ON, OFF and low current state, or the first transistor has two states: ON and low current state. In the former case, when the second transistor is ON, the first transistor is OFF, and when the second transistor is OFF, the first transistor is ON or in the low current state. In the later case, when the first transistor is ON, the second transistor is OFF, and when the second transistor is ON, the first transistor is in the low current state.

For better understanding the objectives, characteristics, and effects of the present invention, the present invention will be described below in detail by illustrative embodiments with reference to the attached drawings.

DESCRIPTION OF THE PREFERRED EMBODIMENT

Figure 6:
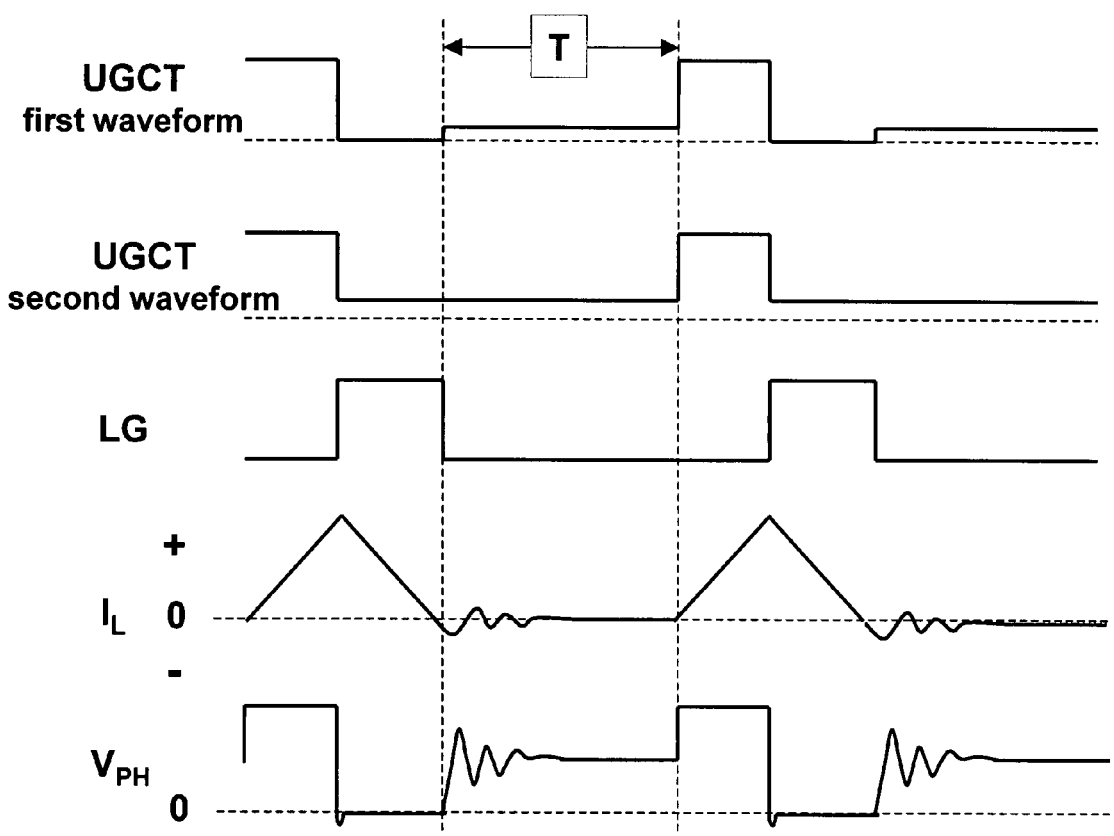
FIGS. 6 and 7 schematically show the spirit of the present invention, when applied to a buck type switching regulator.
Figure 7:
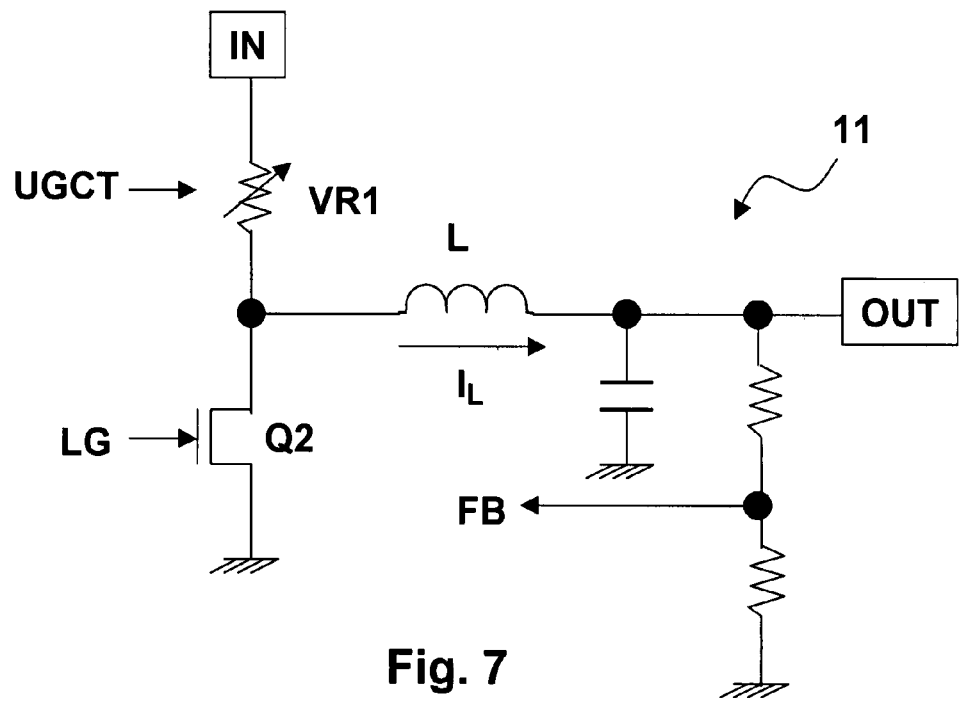

FIGS. 6 and 7 schematically show the waveforms and the structure of a buck type switching regulator according to a preferred embodiment of the present invention, in which the reference "UGCT" is the gate signal of the transistor Q1 and the reference "LG" is the gate signal of the transistor Q2. The key feature of the present invention is that, when the current $I_L$ on the inductor L is about to change from positive to negative, the transistor Q2 is not completely turned OFF, but is switched to a low current state that allows low current to flow through. Thus, the role of the transistor Q1 changes from a simple transistor switch to a variable resistor VR1. As compared with the prior art U.S. Pat. No. 6,580,258, the present invention has significantly reduced the ringing time. FIG. 7 shows the hardware concept wherein the up-gate switch is replaced by a variable resistor VR1 whose resistance is controlled by the signal UGCT.

As shown in FIG. 6, it can be arranged so that the transistor Q1 includes three states: ON, OFF, and low current state (the first Q1 waveform), or only two states: ON, and low current state (the second Q1 waveform). The first arrangement is advantageous in that it has better power conversion efficiency, while the second arrangement is advantageous in that it is less complicated in circuit hardware. Both arrangements belong to the scope of the present invention. In either case, after the transistor Q2 is OFF, the transistor Q1 is in the low current state, i.e., in the time period T, the resistance of the variable resistor is neither zero nor infinity. Also please note that, although the gate voltage of the transistor Q1 is shown in FIG. 6 to be a fixed value in the time period T, the present invention is not limited to this embodiment. The gate voltage of the transistor Q1 can vary in any desired manner, i.e., can be of any waveform in the time period T, provided that the corresponding current amount passing through it is higher than or equal to 1 μA (micro-ampere), but below the current amount that the transistor is fully conductive.

Those skilled in this art would readily find that the transistors Q1 and Q2 shown in the figures are NMOS transistors. Certainly the transistors Q1 and Q2 can be replaced by PMOS transistors; although the corresponding waveforms are different, it still falls in the spirit of the present invention.

Figure 8:
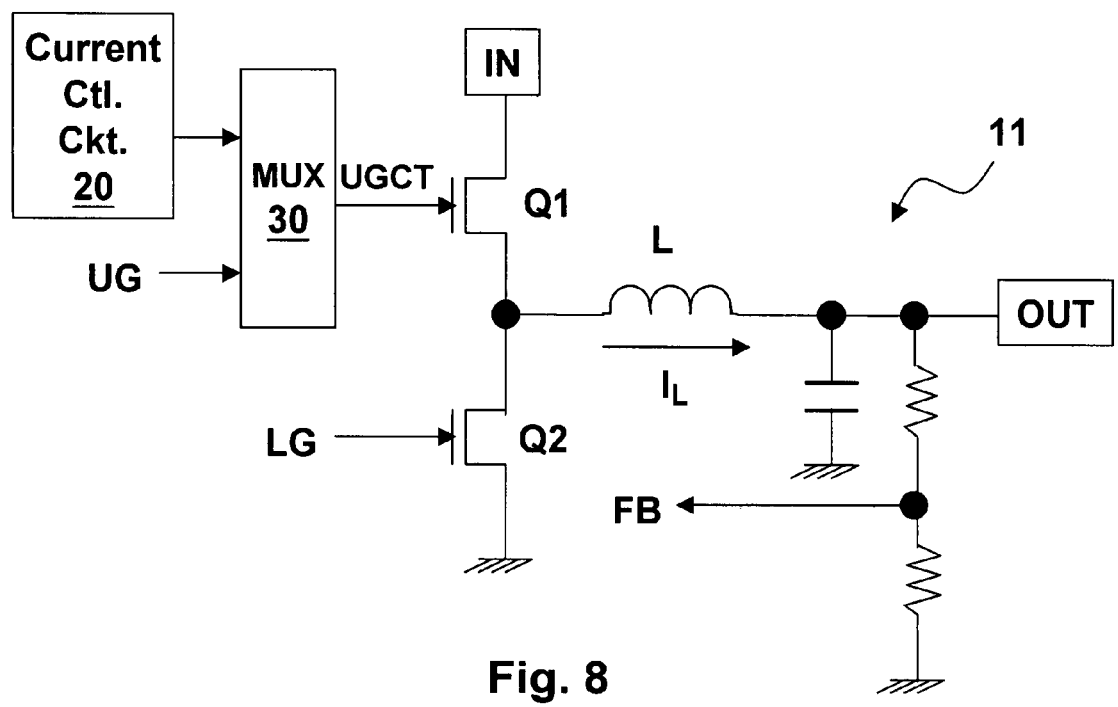
FIG. 8 is a circuit diagram schematically showing an embodiment of the present invention.

For the generation of the control signal UGCT, please refer to FIG. 8 which schematically shows a buck type switching regulator according to a preferred embodiment of the present invention. As shown in the figure, the buck type switching regulator 11 includes a multiplexer circuit (MUX) 30 which selects one of two signals: an up-gate signal UG generated by conventional manner, and the output of a current control circuit 20. The selected signal is supplied to the gate of the transistor Q1. When the transistor Q1 is controlled by the signal UG, its role is a simple switch; when the transistor Q1 is controlled by current control circuit 20, it becomes weakly conductive, allowing low current to pass through it. ("Low current" is any amount of current which is higher than or equal to 1 μA (micro-ampere), but below the current amount that the transistor Q1 is fully conductive.)

Figure 1:
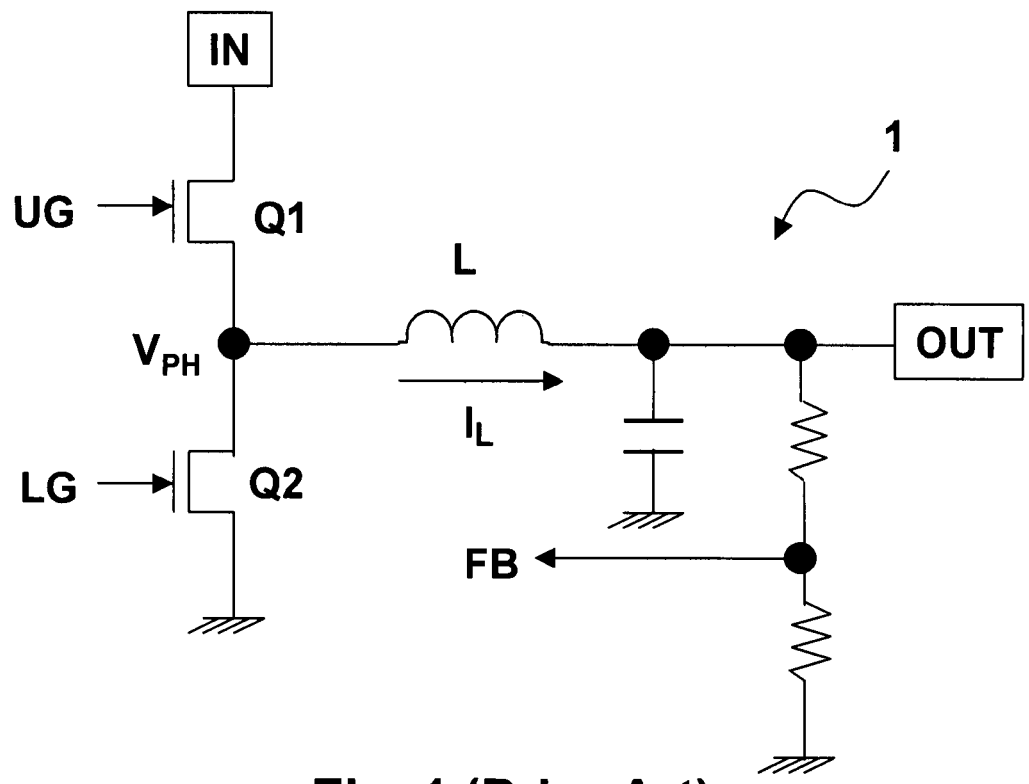
FIG. 1 is a circuit diagram schematically showing a conventional buck type switching regulator.
Figure 2:
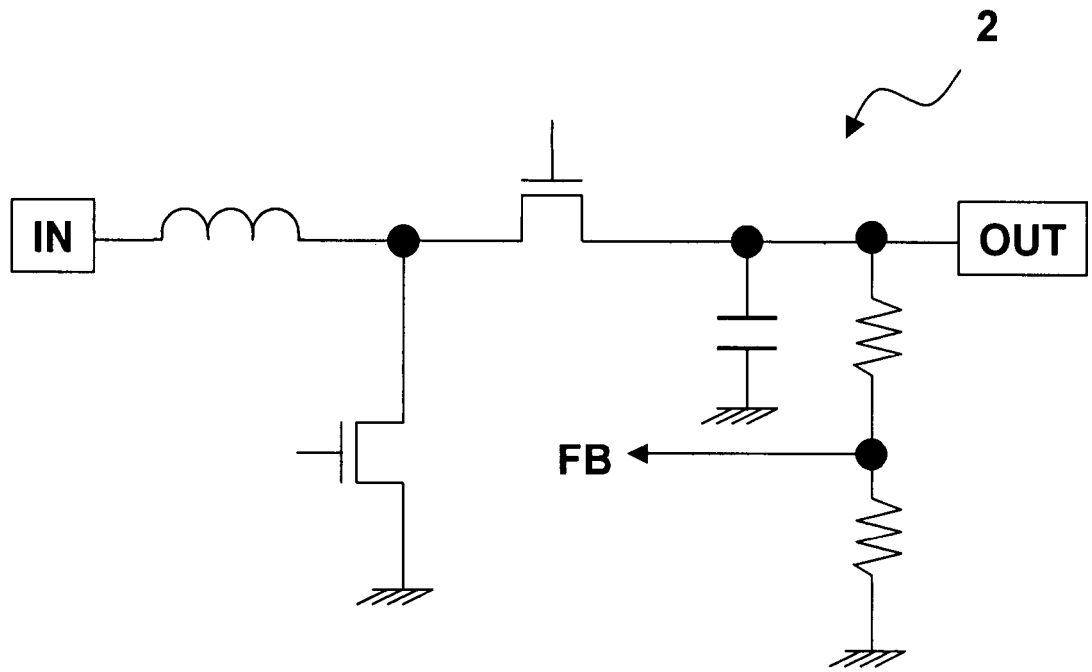
FIG. 2 is a circuit diagram schematically showing a conventional boost type switching regulator.
Figure 3:
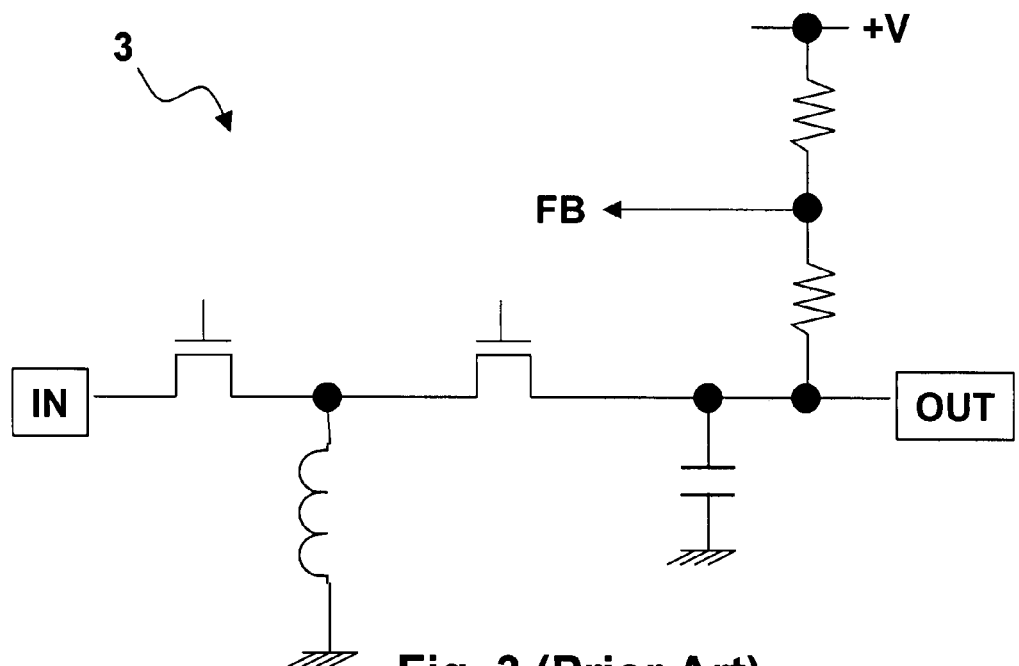
FIG. 3 is a circuit diagram schematically showing a conventional inverter type switching regulator.
Figure 4:
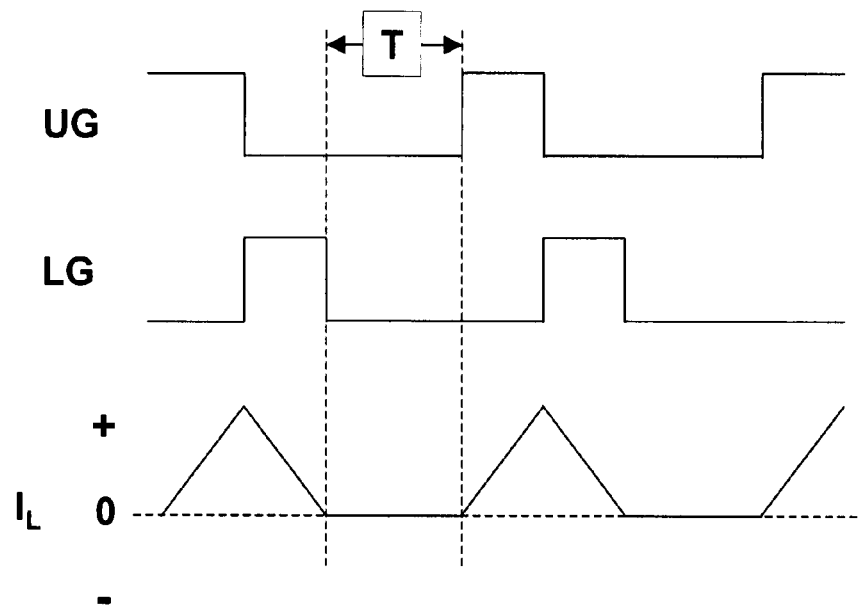
FIG. 4 schematically shows the ideal waveforms of the switching regulator proposed by U.S. Pat. No. 6,580,258.
Figure 5:
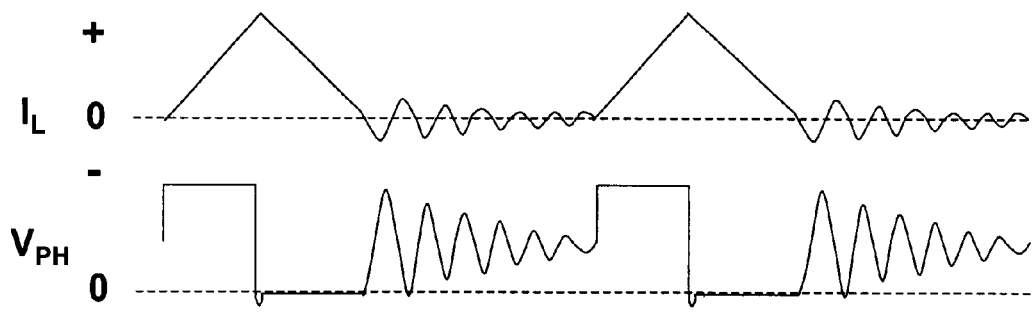
FIG. 5 schematically shows the actual waveforms of the switching regulator proposed by U.S. Pat. No. 6,580,258.
Figure 9:
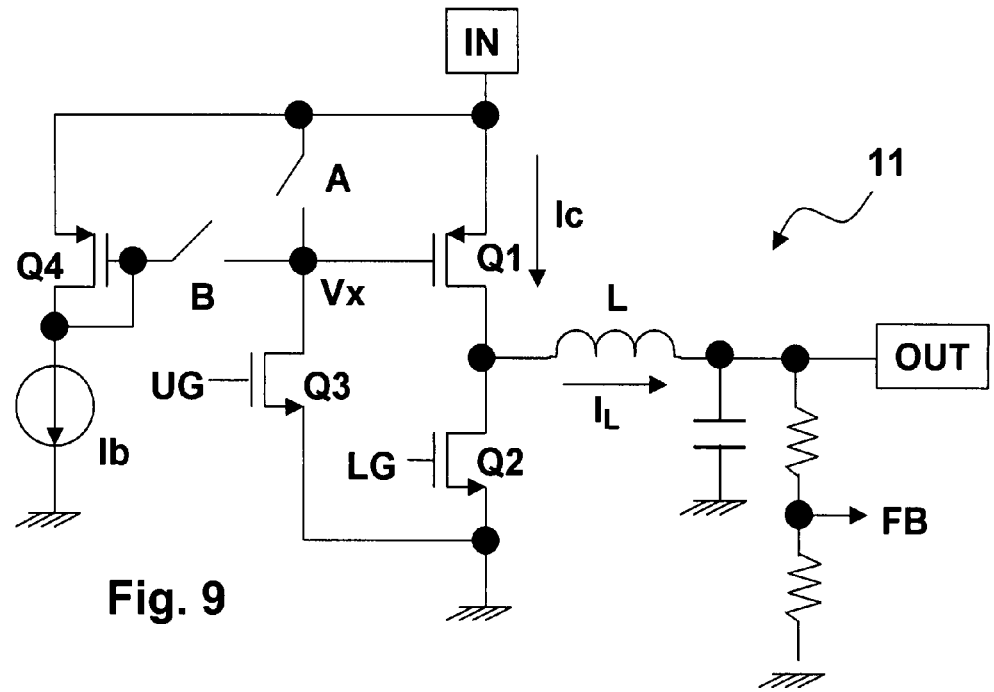
FIGS. 9 and 10 schematically show another embodiment of the present invention, and the corresponding waveforms.
Figure 10:
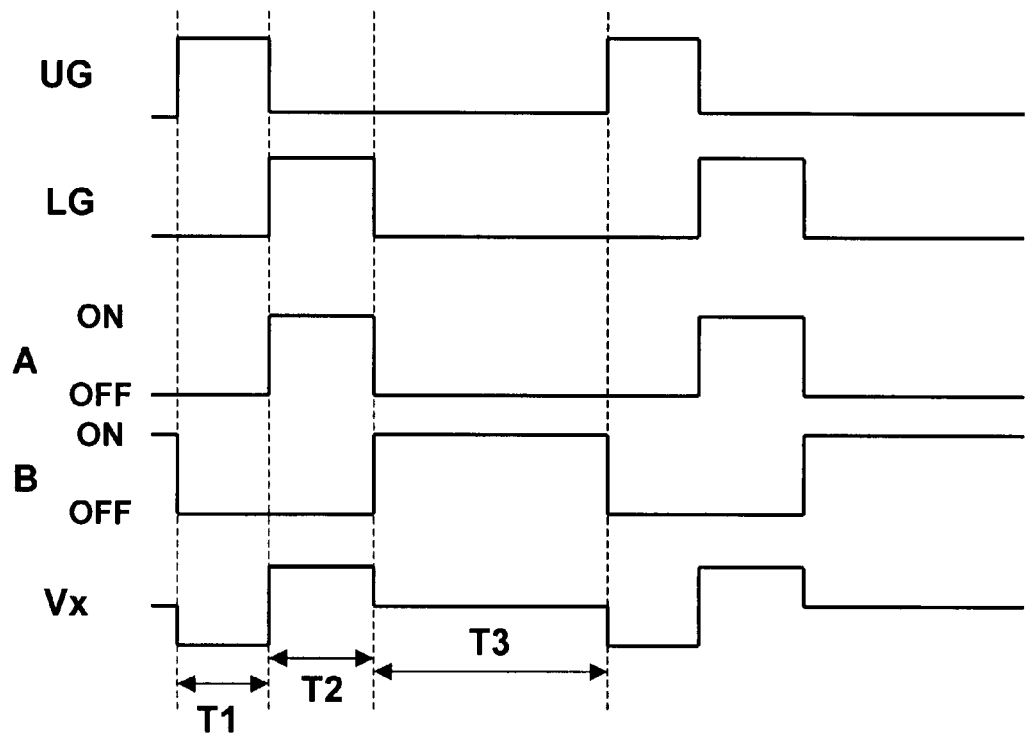

By way of example, a more specific circuit structure corresponding to the foregoing embodiment is shown in FIG. 9, with its corresponding waveforms shown in FIG. 10. In this embodiment, the transistors Q1 and Q4 are PMOS transistors, and the transistors Q2 and Q3 are NMOS transistors. The signals UG and LG are pulse signals having waveforms similar to those shown in FIG. 4. The voltage at the node Vx is the control signal UGCT. In the period T1 when the signal UG is high, the transistor Q3 is ON, and the node Vx is grounded, having a voltage of zero. When the signal UG is low, the transistor Q3 is OFF, and the voltage at the node Vx depends on the switches A and B. In the period T2 when the switch A is closed and the switch B is opened, the voltage at the node Vx is equal to the input voltage IN. In the period T3 when the switch A is opened and the switch B is closed, the transistors Q1 and Q4 form a current mirror which mirrors the current Ib to Ic according to the matching ratio between the transistors Q1 and Q4. The transistor Q1 is thus in the low current state wherein the current Ic passing through the transistor Q1 helps the inductor current $I_L$ to quickly become stable, diminishing the ringing.

In the above circuit, the control signals for the switches A and B can be generated from the signals UG and LG. To ensure correct response by the circuit, preferably, a guard band is provided between the switching timings of the switches A and B; for example, after the switch A is closed, it is opened slightly later than the signal LG, and the switch B is closed after the switch A is opened for a small while, etc. FIG. 10 only shows the waveforms in a macro view, wherein such minor details are omitted for simplicity. Those skilled in this art can add in such details according to what is required, under the teachings of the present invention.

In addition to the anti-ringing effect, because of the current Ic additionally supplied from the input terminal IN when the low-gate transistor Q2 is OFF, the efficiency to transmit power to the output terminal OUT is improved. Therefore, as compared with prior art, for the same requirement of output voltage, the switching frequencies of the transistors Q1 and Q2 in the present invention can be lowered, and hence the switching loss is reduced. This merit is more obvious in the light load condition.

Figure 11:
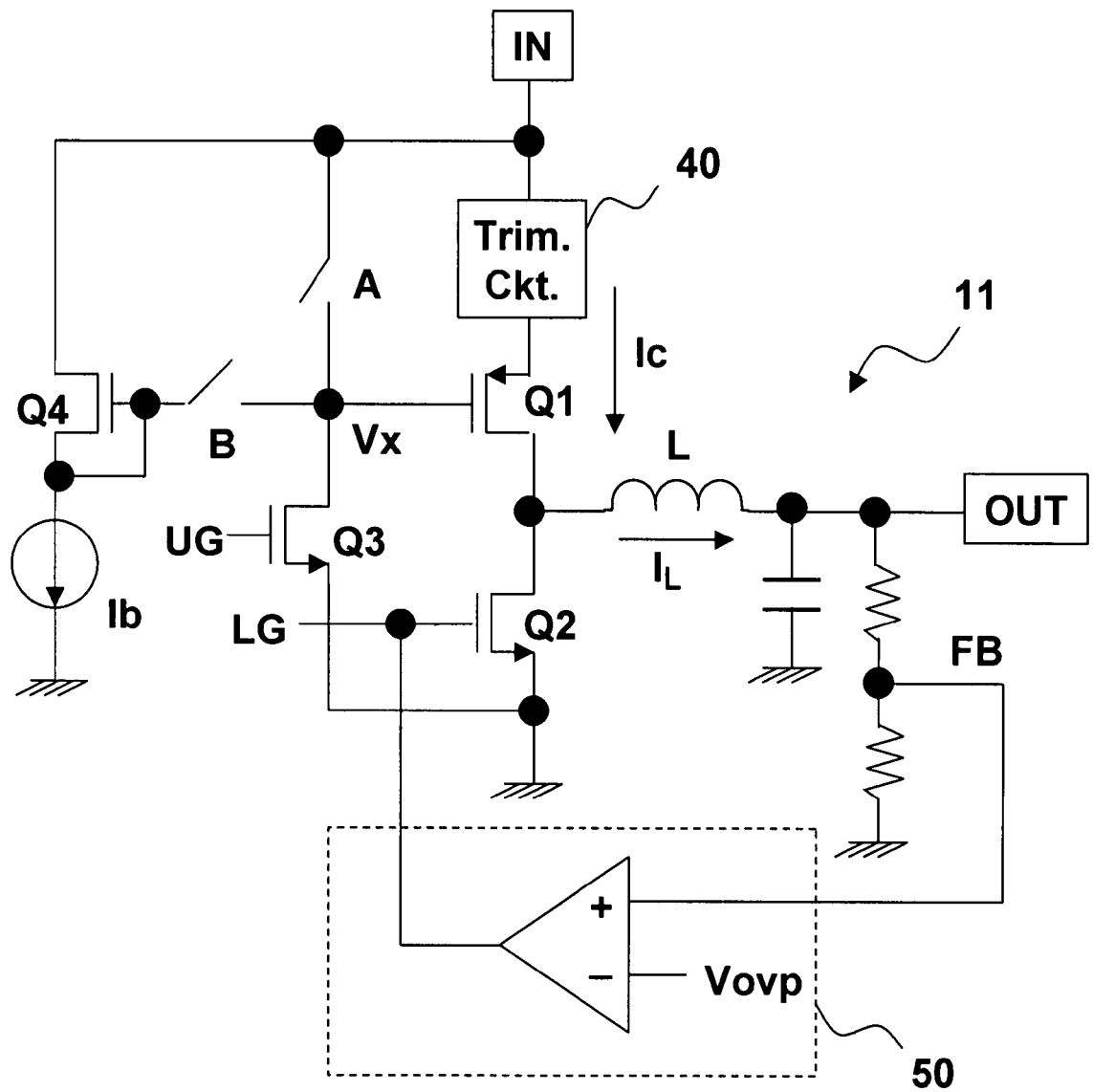
FIG. 11 is a circuit diagram schematically showing a further embodiment of the present invention.

Also because of the additionally supplied current Ic, as shown in FIG. 11, it is preferred that the circuit is provided with a trimming circuit 40 and an over voltage protection circuit 50. The function of the trimming circuit 40 is to filter out abnormal conditions in the current Ic, and the function of the over voltage protection circuit 50 is to prevent the output voltage from overly increasing due to the additionally supplied current Ic. There are many ways to embody the over voltage protection circuit 50, one of which is shown in the figure, by comparing the feedback signal FB with a reference voltage Vovp. When the comparison shows that the output voltage is too high, the transistor Q2 is turned ON. Still, there are other ways to embody the over voltage protection circuit 50 as readily conceivable by those skilled in this art.

Figure 12:
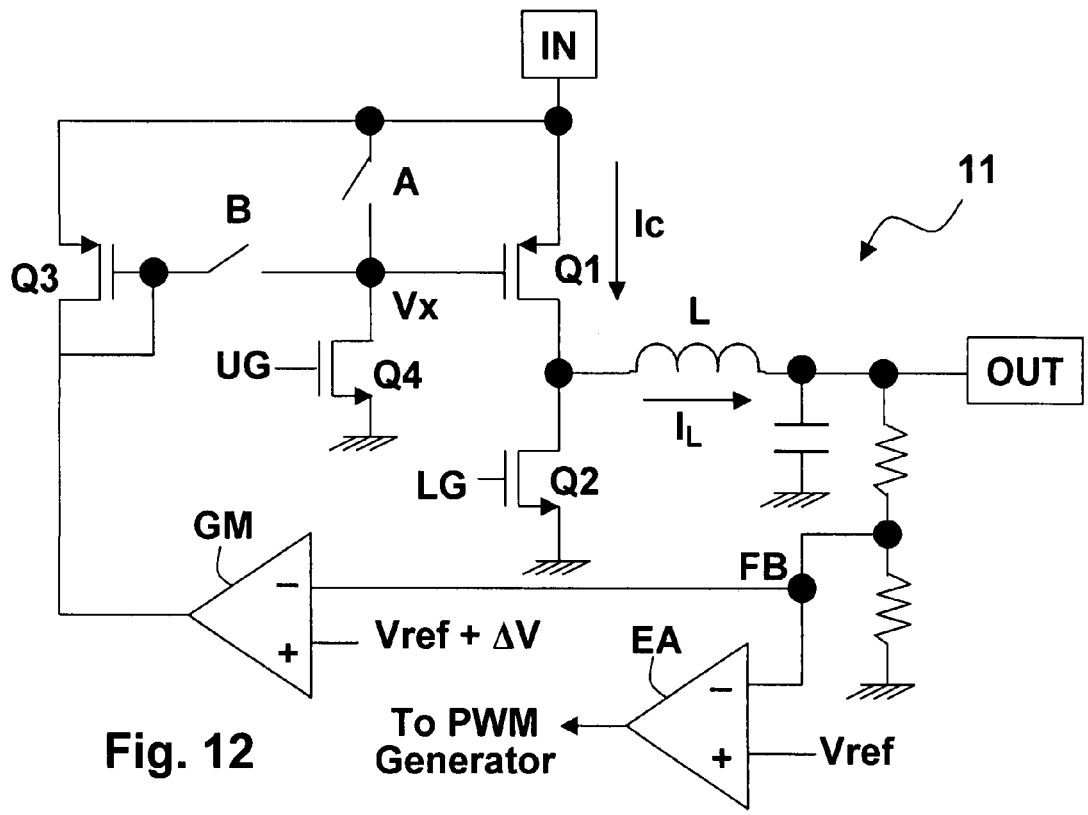
FIGS. 12 and 13 schematically show yet another embodiment of the present invention, and the corresponding waveforms.

The waveforms of FIG. 6 can be achieved by many ways other than the above. Another embodiment of the present invention is shown in FIG. 12. In this embodiment, the transistors Q1 and Q3 are PMOS transistors and Q2 and Q4 are NMOS transistors; the signals UG and LG are pulse signals having waveforms similar to those shown in FIG. 4; the voltage at the node Vx is the control signal UGCT.

The conventional method for generating the signals UG and LG is to compare the feedback signal FB with a reference voltage Vref by an error amplifier EA, and the result is sent to a PWM signal generator (not shown) to generate the signals UG and LG. In this embodiment, besides the primary PWM loop, a secondary loop is provided for reducing ringing and voltage regulation. As shown in the figure, in this secondary loop the feedback signal FB is compared with another reference voltage in a transconductor GM. This other reference voltage is slightly higher than the reference voltage Vref, so it is expressed as Vref+ΔV in the figure. The output of the transconductor GM is supplied to the drain and gate of the transistor Q4. When the secondary loop functions, and the current supplied to the output terminal is smaller than the maximum current that the secondary loop can provide, the feedback voltage FB will be stabilized at the value Vref+ΔV. When the current supplied to the output terminal is larger than the maximum current that the secondary loop can provide, the feedback voltage FB will be lower than the value Vref, and the primary PWM loop will take over to control the switching regulator.

Figure 13:
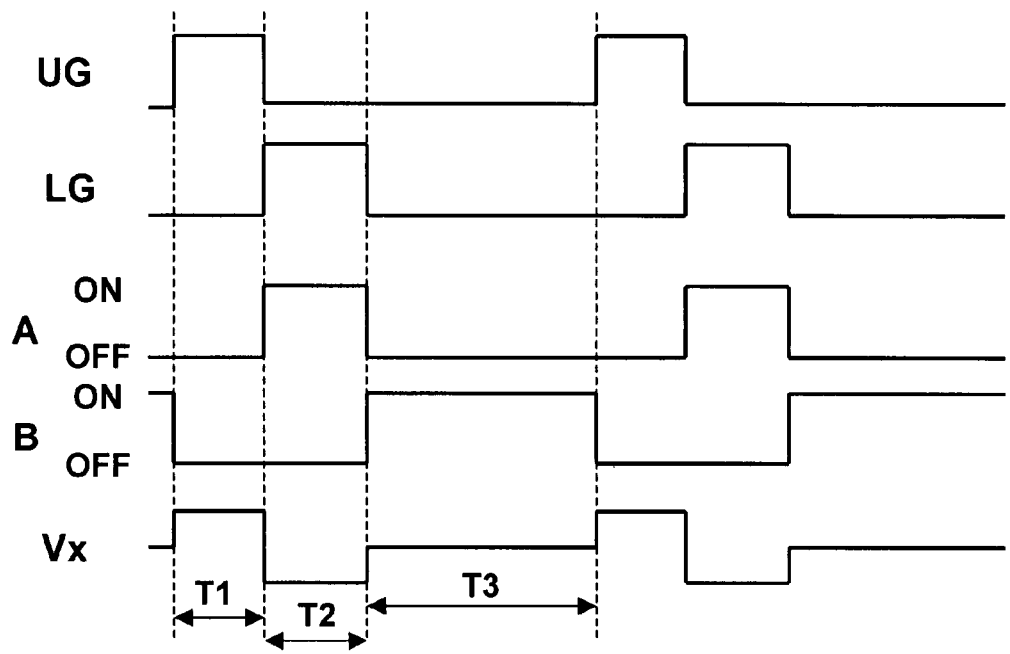

Referring to FIG. 13, in the period T1 when the signal UG is high and the switch A is opened, the transistor Q4 is ON, and the voltage at the node Vx is at low level. When the signal UG is low, the transistor Q4 is OFF, and the voltage at the node Vx depends on the switches A and B. In the period T2 when the switch A is closed and the switch B is opened, the node Vx is at high level and the transistor Q1 is turned OFF. In the period T3 when the switch A is opened and the switch B is closed, the circuit behaves like a linear regulator with a reference voltage of Vref+$\Delta$V. The voltage at the node Vx is controlled by the output of the transconductor GM, whereby the transistor Q1 becomes weakly conductive wherein the current Ic passing through the transistor Q1 helps the inductor current $I_L$ to quickly become stable, diminishing the ringing.

Similar to the previous embodiment, a trimming circuit and an over voltage protection circuit can be provided in this embodiment, and a guard band can be provided between the switching timings of the switches A and B, which are omitted in the figure.

The features, characteristics and effects of the present invention have been described with reference to its preferred embodiments, which are provided only for illustrative purpose. Various other substitutions and modifications will occur to one skilled in the art, without departing from the spirit of the present invention. For example, in the described embodiments, the feedback signal is obtained by dividing the output voltage Vout. However, the feedback signal can be obtained by many ways other than such. As another example, one can add an insignificant device, such as a switch into the circuit of any embodiments. As a further example, the spirit of the present invention can be similarly applied to boost type and inverter type switching regulators. Therefore, all such substitutions and modifications are intended to be embraced within the scope of the invention as defined in the appended claims.

What is claimed is:

1. An anti-ringing switching regulator comprising:
   a first transistor having at least two states: ON and low current state, a second transistor, and an inductor electrically connected to a common node, wherein the first transistor is electrically connected with an input terminal, the second transistor is electrically connected to ground, and the inductor is electrically connected to an output terminal, and wherein power is transmitted from the input terminal to the output terminal by switching the states of the first and second transistors;
   a current control circuit for setting the first transistor into the low current state, the current control circuit including a third transistor and a current source electrically connected with the third transistor; and
   a multiplexer circuit having one of its inputs receiving the output of the current control circuit, and an output controlling the gate of the first transistor;
   wherein when the multiplexer circuit selects the current control circuit, the current control circuit mirrors the current of the current source proportionally to the first transistor.

2. The anti-ringing switching regulator of claim 1, wherein when the first transistor is ON, the second transistor is OFF; and when the second transistor is ON, the first transistor is in the low current state.

3. The anti-ringing switching regulator of claim 1, wherein the first transistor has three states: ON, OFF and low current state.

4. The anti-ringing switching regulator of claim 3, wherein when the second transistor is ON, the first transistor is OFF; and when the second transistor is OFF, the first transistor is ON or in the low current state.

5. The anti-ringing switching regulator of claim 1, further comprising means for obtaining a feedback signal from the output terminal and means for generating an up-gate and a low-gate control signals, the up-gate control signal being supplied as another input of the multiplexer circuit, and the low-gate control signal controlling the switching of the second transistor.

6. An anti-ringing switching regulator comprising:
   a first transistor having at least two states: ON and low current state, a second transistor, and an inductor electrically connected to a common node, wherein the first transistor is electrically connected with an input terminal, the second transistor is electrically connected to ground, and the inductor is electrically connected to an output terminal, and wherein power is transmitted from the input terminal to the output terminal by switching the states of the first and second transistors;
   a current control circuit for setting the first transistor into the low current state; and
   a multiplexer circuit having one of its inputs receiving the output of the current control circuit, and an output controlling the gate of the first transistor;
   wherein the current control circuit includes a transconductor which generates an output by comparing a feedback signal obtained from the output terminal, with a reference voltage, and when the multiplexer circuit selects the current control circuit, the current control circuit mirrors the output current of the transconductor proportionally to the first transistor.

7. A method for controlling a switching regulator, comprising the steps of:
   providing a switching regulator including a first transistor, a second transistor, and an inductor electrically connected to a common node, wherein the first transistor is electrically connected with an input terminal, the second transistor is electrically connected to ground, and the inductor is electrically connected to an output terminal;
   switching the states of the first and second transistors;
   selectively providing one of a first and a second control signals to the gate of the first transistor, wherein under the first control signal, the first transistor switches between ON and OFF, and under the second control signal, the first transistor is in a low current state, and wherein the second control signal is generated by a third transistor and a current source electrically connected with the third transistor; and
   in a time period after the second transistor switches OFF, setting the first transistor in the low current state.

8. The method of claim 7, further comprising the steps of:
   obtaining a feedback signal from the output terminal, and generating an up-gate and a low-gate control signals, the up-gate control signal being supplied as the first control signal, and the low-gate control signal controlling the switching of the second transistor.

9. A method for controlling a switching regulator, comprising the steps of:
   providing a switching regulator including a first transistor, a second transistor, and an inductor electrically connected to a common node, wherein the first transistor is electrically connected with an input terminal, the second transistor is electrically connected to ground, and the inductor is electrically connected to an output terminal;
   switching the states of the first and second transistors;

selectively providing one of a first and a second control signals to the gate of the first transistor, wherein under the first control signal, the first transistor switches between ON and OFF, and under the second control signal, the first transistor is in a low current state and wherein the second control signal is generated by:

obtaining a feedback signal from the output terminal;

comparing the feedback signal with a reference voltage by a transconductor; and generating the second control signal according to the output of the transconductor, so that the output of the transconductor is mirrored proportionally to the first transistor; and in a time period after the second transistor switches OFF, setting the first transistor in the low current state.

* * * * *